US007341334B2

(12) United States Patent
Auslander et al.

(10) Patent No.: US 7,341,334 B2
(45) Date of Patent: Mar. 11, 2008

(54) SYSTEM AND METHOD FOR PREVENTING SECURITY INK TAMPERING

(75) Inventors: Judith D. Auslander, Wesport, CT (US); Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 309 days.

(21) Appl. No.: 10/972,800

(22) Filed: Oct. 25, 2004

(65) Prior Publication Data

US 2006/0087537 A1 Apr. 27, 2006

(51) Int. Cl.
*B41J 2/175* (2006.01)
*C09D 11/00* (2006.01)

(52) U.S. Cl. .................................... 347/85; 106/31.32

(58) Field of Classification Search .................. 347/85; 106/31.32

See application file for complete search history.

(56) References Cited

U.S. PATENT DOCUMENTS 6,345,889 B1 * 2/2002 Sakuraoka et al. ........... 347/86
6,499,840 B2 * 12/2002 Day et al. ................... 347/100
6,793,723 B2 9/2004 Auslander et al.
6,799,845 B2 * 10/2004 Kaneko et al. ............. 347/100
2003/0005303 A1 1/2003 Auslander et al.
2003/0041774 A1 * 3/2003 Auslander et al. ....... 106/31.32
2003/0184626 A1 * 10/2003 Sasaki et al. ................. 347/86
2004/0135859 A1 * 7/2004 German et al. ............... 347/95
2005/0002696 A1 * 1/2005 Fordahl et al. ............. 399/237

* cited by examiner

*Primary Examiner*—Stephen Meier
*Assistant Examiner*—Sarah Al-Hashimi
(74) *Attorney, Agent, or Firm*—Charles R. Malandra, Jr.; Angelo N. Chaclas

(57) ABSTRACT

An ink supply system for a printer including an inner chamber comprising a controlled security ink; an outer chamber comprising a chemical; an ink conduit from the inner chamber through and out of the outer chamber; and a rupture wall at a junction between the inner chamber and the outer chamber. The ink conduit keeps the chemical away from the ink when the ink travels from the inner chamber out of the ink supply system. When the rupture wall is ruptured, the chemical is adapted to interact with the controlled security ink to indicate that the rupture has occurred.

19 Claims, 4 Drawing Sheets

SYSTEM AND METHOD FOR PREVENTING SECURITY INK TAMPERING

BACKGROUND OF THE INVENTION

1. Field of the Invention

The present invention relates to controlled security inks and, more particularly, to controlling use of a controlled security ink.

2. Brief Description of Prior Developments

Color fluorescent inks are known such as described in U.S. Patent Application Publication Nos. US 2002/0195586 A1 (now U.S. Pat. No. 6,793,723), US 2003/0005303 A1, and US 2003/0041774 A1, which are hereby incorporated by reference in their entireties. Invisible ink jet inks are also described in U.S. patent application Ser. No. 10/331829 filed Dec. 30, 2002, which is also hereby incorporated by reference in its entirety. Use of fluorescent inks for hidden indicium is described in U.S. patent application Ser. No. 10/692569, filed Oct. 24, 2003, which is also hereby incorporated by reference in its entirety.

Luminescent inks, such as fluorescent or phosphorescent inks, can be used for security marking of a document, such as a postage indicium. Theft of controlled ink and reuse in a non-secure system could allow counterfeit postage or other secure documents to be printed without authorization. Originally, postage meters used physically secure printing mechanisms that were located within tamper proof housing. For example, see Postage Meter Model 6500 manufactured by Pitney Bowes Inc. of Stamford, Conn. Each of these secure printing mechanisms had unique characteristics that were identifiable for security purposes. With the advent of Internet postage, postage can be printed on non-secure print heads, so secure inks may be desired in some applications to evidence that the images have been printed on an authorized device. Tickets or other secure documents may be checked for validity at the time of acceptance by checking the ink features as well as other security devices or embedded mathematical algorithms (e.g. hash). There is a desire to secure controlled security ink and disable a security feature of the ink before it can be misused. There is a desire to prevent use of the ink in a wrong printing device, and disable a printing cartridge if it is tampered with. There is a desire to use such a system in postage meters, and with secure documents generated by mailing machines and postage meter technologies (e.g. receipts, tickets).

Standard ink jet containers are known in the printer art. Use of mechanical shape differences to discourage use of generic toner cartridges in proprietary fax machines or copiers is also known. Use of a dye to mark heating fuel (no tax paid) as compared to diesel fuel (tax paid) also exists. Presence of the dye in a vehicle gas tank can demonstrate theft of non-tax paid fuel. Automobile anti-theft devices which disable the engine are also known.

SUMMARY OF THE INVENTION

In accordance with one aspect of the present invention, an ink supply for a printer including an inner chamber is provided comprising a controlled security ink; an outer chamber comprising a chemical; an ink conduit from the inner chamber through and out of the outer chamber; and a rupture wall at a junction between the inner chamber and the outer chamber. The ink conduit keeps the chemical away from the ink when the ink travels from the inner chamber out of the ink supply. When the rupture wall is ruptured, the chemical is adapted to interact with the controlled security ink to indicate that the rupture has occurred.

In accordance with another aspect of the present invention, an ink cartridge for a printer is provided comprising a housing; a security ink contained in the housing; and a security ink quencher contained in the housing separate from the security ink. The ink cartridge is adapted to mix the security ink quencher with the security ink upon a predetermined event.

In accordance with another aspect of the present invention, a postage meter ink cartridge is provided comprising a housing; a security ink contained in the housing; a security system on the housing for allowing the ink cartridge to be used with only a predetermined type of authorized printer, wherein the security system comprises: a cartridge enablement system to enable printing of the security ink from the authorized printer only when the ink cartridge is installed in the authorized printer, or a tamper system to disable the security ink or disable the ink cartridge, or indicate tampering, when the cartridge is attempted to be used in an unauthorized printer or the security ink is attempted to be used in the unauthorized printer.

In accordance with one method of the present invention, a method of at least partially disabling a security ink for a printer is provided comprising providing an ink cartridge having the security ink, a security ink quencher surrounding at least a portion of the security ink, and a rupture wall between the security ink and the security ink quencher; rupturing the rupture wall when a user attempts to gain unauthorized access to the security ink inside the ink cartridge and thereby mixing the security ink quencher with the security ink to change a feature of the security ink.

In accordance with another method of the present invention, a method of enabling or disabling use of a security ink cartridge or security ink in the security ink cartridge is provided comprising installing the security ink cartridge in an authorized printer, and enabling a system to dispense ink from the cartridge to the printer based upon installation of the security ink cartridge in the authorized printer; or actuating a tamper system in the security ink cartridge when the cartridge is attempted to be used in an unauthorized printer or when the security ink is attempted to be removed from the security ink cartridge for use in an unauthorized printer.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
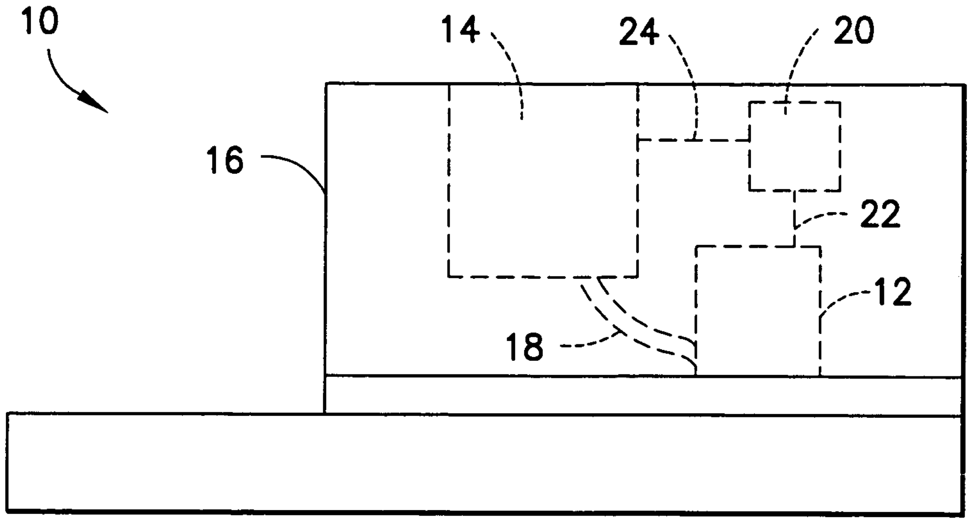
FIG. 1 is a front elevational view of a postage meter incorporating features of the present invention.

Referring to FIG. 1, there is shown a front elevational view of a printing device 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The printing device 10 comprises a postage meter. However, in alternate embodiments, features of the present invention could be used in other types of printing devices. The postage meter 10 generally comprises a print head 12 and a removable ink cartridge 14. The cartridge 14 is removably received in a housing 16 of the postage meter 10. A conduit 18 is adapted to supply ink from the ink cartridge 14 to the print head 12. In an alternate embodiment (not shown), the working head of the cartridge could comprise a conventional inkjet cartridge nozzle, and the cartridge could be adapted to be inserted into the print head as part of the print head. The postage meter 10 also comprises a controller 20. The controller 20 can comprise any suitable type of controller such as a microprocessor for example. The controller 20 is operably connected to the print head 12 by line 22. The controller 20 can also be coupled to an electronic component in the removable ink cartridge 14 as shown by line 24.

Figure 2:
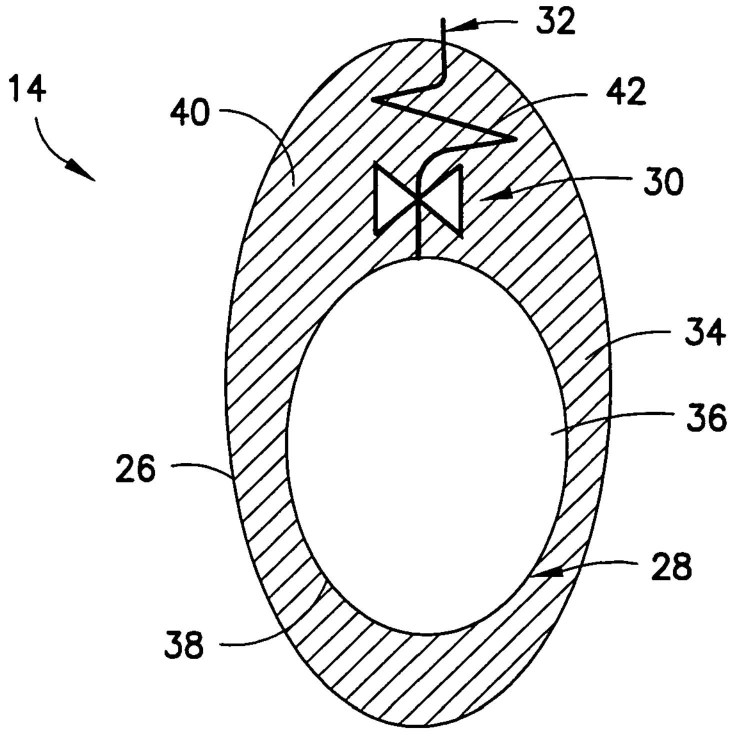
FIG. 2 is a schematic cross sectional view of an ink cartridge used in the postage meter shown in FIG. 1.

Referring also to FIG. 2, a schematic cross sectional diagram of the ink cartridge 14 is shown. Although the cartridge 14 is shown with a general oval shaped cross-section, the cartridge 14 can have any suitable type of exterior shape or profile. The cartridge 14 generally comprises an outer housing 26, an inner chamber wall 28, an ink valve 30, and an ink conduit system 32. The outer housing 26 and the inner chamber wall 28 combined to form two chambers 34, 36. In alternate embodiments the cartridge 14 could comprise more than two chambers. In the embodiment shown, the first chamber 34 forms an outer chamber which substantially entirely surrounds the second chamber 36 which forms an inner chamber. The ink cartridge 14 comprises a controlled security ink 38 located in the inner chamber 36 and a chemical 40 located in the outer chamber 34. In the embodiment shown, the chemical 40 comprises an ink quencher as further described below.

The ink conduit system 32 comprises an ink conduit from the inner chamber 36 through and out of the outer chamber 34. The ink valve 30 is coupled to the ink conduit system 32 to control dispensing of the controlled security ink 38 through the ink conduit system 32. The ink conduit system 32 keeps the chemical 40 away from the ink 38 when the ink travels from the inner chamber 36 out of the cartridge 14. In the embodiment shown, the ink conduit comprises a bending path 42.

The inner chamber wall 28 forms a barrier between the controlled security ink 38 in the inner chamber 36 and the chemical 40 in the outer chamber 34. In a preferred embodiment, the inner chamber wall 28 comprises a rupture wall. The rupture wall 28 is located at the junction between the inner chamber and the outer chamber. Rupture wall 28 is adapted to rupture when a user attempts to gain unauthorized access to the security ink 38 by piercing through the rupture wall 28. When the rupture wall 28 is ruptured, the chemical 40 is adapted to interact with the controlled security ink 38 to indicate that the rupture has occurred. An indication that a rupture of the rupture wall has occurred is an indication that the controlled security ink has not been properly dispensed through the ink valve 30 and ink conduit system 32.

The controlled security ink 38 preferably comprises a luminescent ink, such as a fluorescent ink or a phosphorescent ink. As mentioned above, U.S. patent application Ser. No. 10/692569, filed Oct. 24, 2003, describes use of color fluorescent ink. In addition, as mentioned above, color fluorescent inks are known such as described in U.S. patent application publication Nos. US 2002/0195586 A1 (now U.S. Pat. No. 6,793,723), US 2003/0005303 A1, and US 2003/0041774 A1. An indicium, such as a postage meter indicium, printed with the security ink 38 can be visible under normal daylight conditions, and can also be read by a reader, such as when the indicium is exposed to an energy source which excites the ink for fluorescent or phosphorescent reading.

The present invention provides a system for preventing the theft or unauthorized use of the security ink 38. Theft of controlled ink and reuse in a non-secure system could allow counterfeit postage or other secure documents to be printed without authorization. Secure inks may include fluorescent inks for use in postage applications, or inks which change their visible color depending upon the angle of view for use in secure printing applications. The system can disable a controlled ink so that ink cannot be removed from the ink cartridge and misused. This system can also prevent the controlled ink from being used within the intact ink cartridge in an unauthorized printer. The system can also alter the controlled ink such that the unauthorized use is dearly visible.

Figure 3:
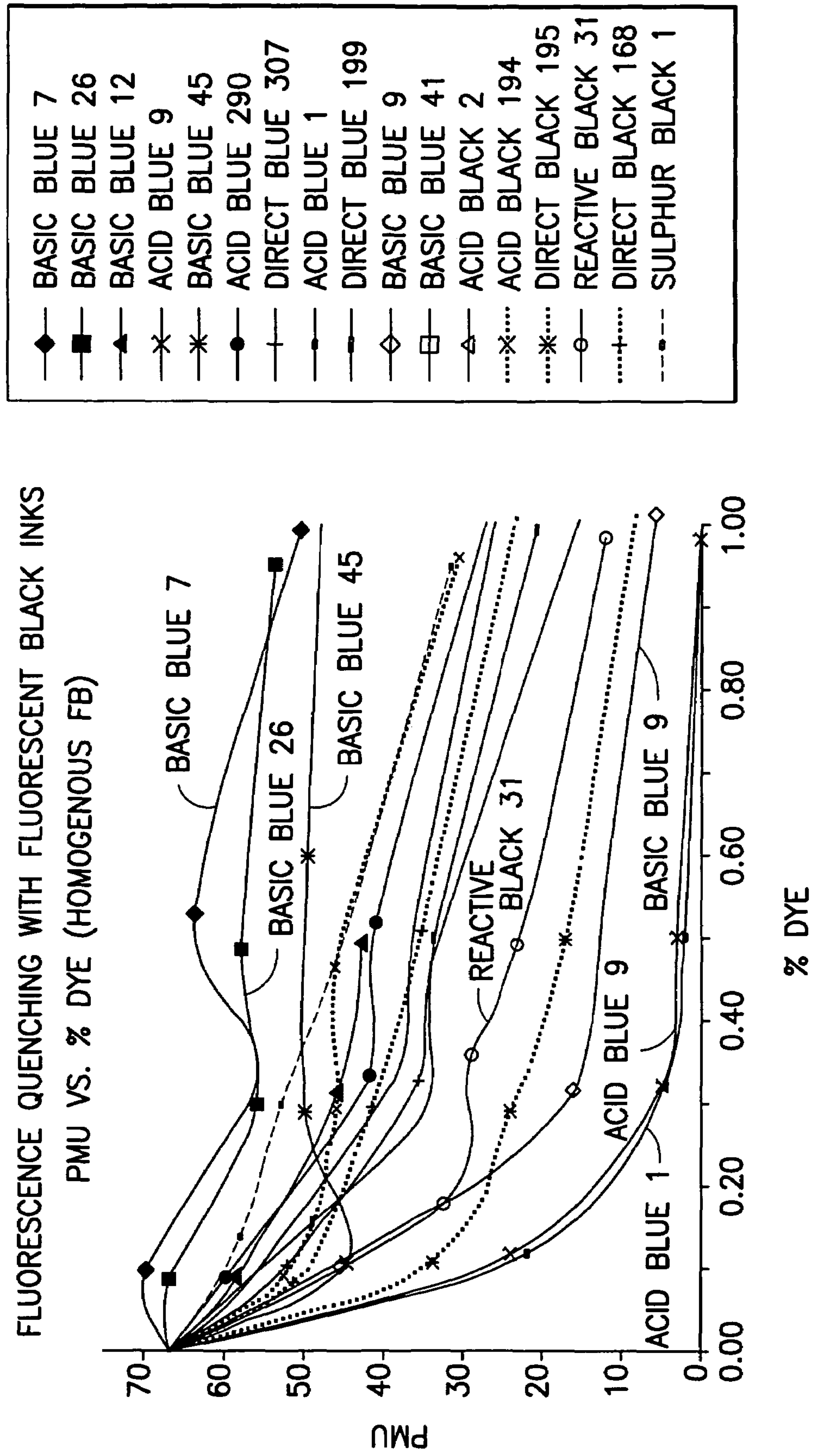
FIG. 3 is a chart showing effects on a homogeneous black fluorescent ink intensity when various concentrations of additional dyes are added.

For the embodiment of when the controlled security ink 38 comprises a fluorescent ink, chemicals have been discovered which will "quench" the fluorescent activity of secure fluorescent controlled supply inks. Referring also to FIG. 3, a number of different non-fluorescent inks were added to a black fluorescent security ink in different concentrations to determine the effect on the intensity of fluorescence measured in Phosphor Meter Units (PMU). Examples of the black fluorescent security ink are described in U.S. Patent Application Publication Nos. US 2002/0195586 A1 (now U.S. Pat. No. 6,793,723), which provides homogeneous photosensitive optically variable ink compositions for ink jet printing, and US 2003/0041774 A1, which provides photosensitive optically variable ink heterogeneous compositions for ink jet printing.

As seen in FIG. 3, both Acid Blue 1 and Acid Blue 9 can reduce PMU activity of the black fluorescent ink from 68 PMU to 4 PMU when added in concentrations as low as 0.4%. This ability to quench a security feature activity with addition of a small quantity of material illustrates the technical feasibility and viability of a secure "controlled supply ink" system. The ink can be distributed in doubled walled containers in which the outer chamber contains a chemical that quenches (disables or dearly alters) at least one security feature of the controlled security ink within the inner chamber. If attempts are made to remove the ink, the punctured outer wall chamber ink quencher can mix with the inner chamber ink and disables or marks it as improperly used. Attempts to misuse the cartridge may also permanently disable the cartridge when a tamper sensor, which is described below, is triggered. This may disable the electronics and/or trigger a release of the ink quencher.

Figure 4:
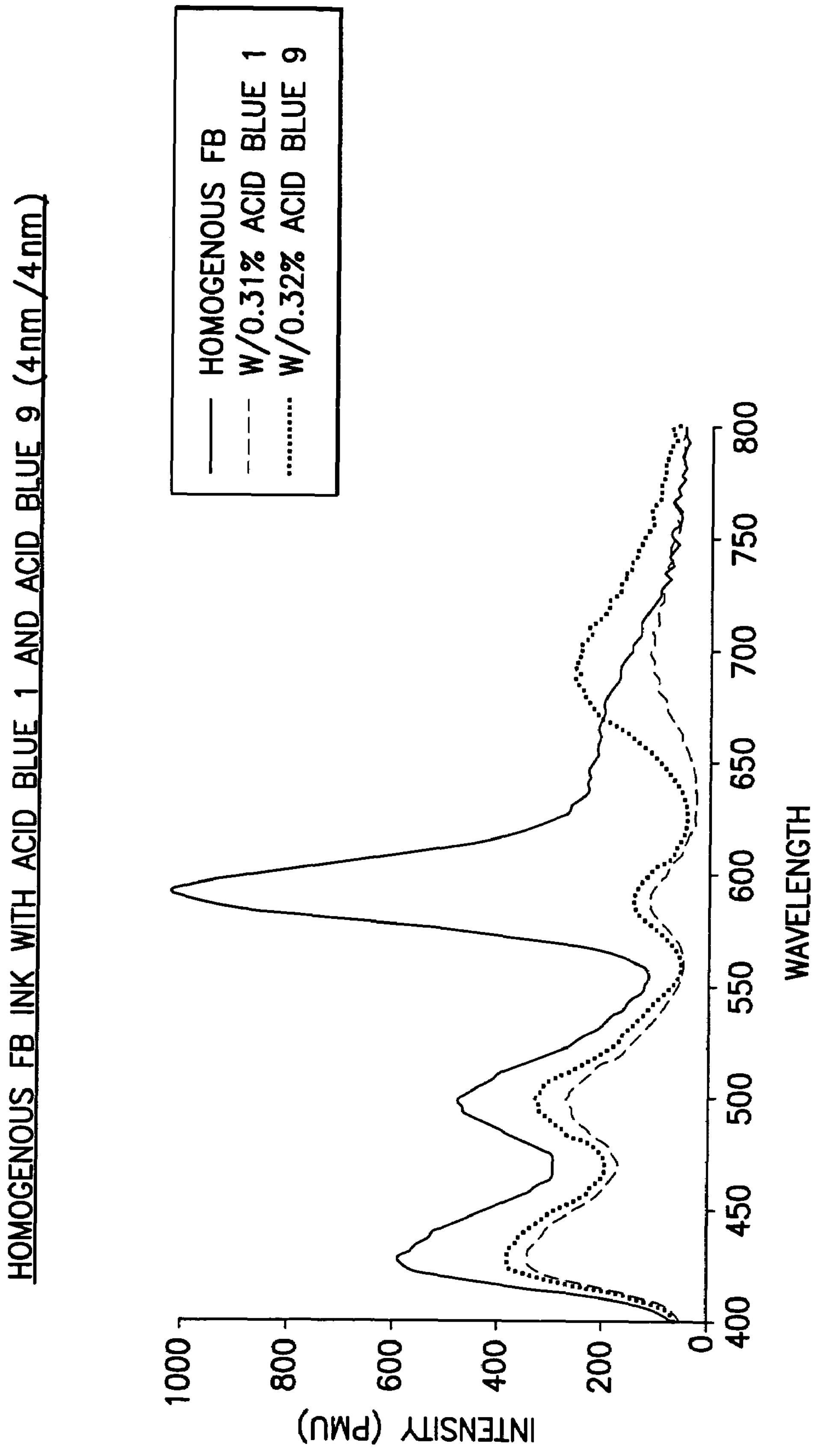
FIG. 4 is a chart showing fluorescence intensity at different wavelengths for homogeneous black fluorescent ink, black fluorescent ink with 0.31% Acid Blue 1 ink added, and black fluorescent ink with 0.32% Acid Blue 9 ink added.

The most effective quenchers by far were Acid Blue 1 and Acid Blue 9. Acid Blue 1 proved to be a more favorable quencher since it showed a lower "shoulder" in emission scans as seen in FIG. 4. The homogeneous formulation was tested with the same dyes as the heterogeneous formulation.

The homogeneous formulation was shown to be more resistant to change in color than the heterogeneous formulation. Most of the dyes tested showed little color change in normal daylight even though the PMU dropped.

The invention can comprise a particular application in which the ink is being distributed for use in a device by an end user. The objective is that an ink jet cartridge (such as shown in cross section in FIG. 2) protects against an end user drilling into the ink cartridge and extracting the ink for use in another unapproved application. The inkjet printer can have several specific features. The secure ink 38 can be stored in an inner chamber. The quencher chemical (or mixture) can be stored in the outer chamber 36. This chemical can have one of several properties. It may be a marker. For instance, in the case of a red postage meter ink with a fluorescent characteristic, the chemical could be a bright blue or black dye that would be readily visible to the human eye looking at the meter indicia. The chemical could also be a quencher of a characteristic trait of the secure ink. It could react with the fluorescent material to block the effect. It could absorb the fluorescence, or it could cause the ink to polymerize when punctured.

The tube leading the ink 38 out of the ink jet can follow a bending path to prevent someone from inserting a needle through the path into the cartridge to extract the ink. The optional control value 30 can be located below the bends in the tubing (so that the ink flow is controlled before it can be accessed). Insertion of a needle into the tube can cause a puncture and release of the quencher/chemical 40.

The outer chamber 34 might be pressurized to assist it in filling the space left as security ink 38 is drained. The wall 28 between the chemical/quencher and the secure ink is preferably a flexible wall to allow the secure ink 38 to be removed in use and the chemical/quencher 40 to conform to that changing ink chamber. That wall 28 (it could be a rubber or plastic) should be designed to rupture easily when punctured (like a balloon that shatters when punctured) so that the quencher 40 mixes with the secure ink 38 and disables reuse or signals misuse or misappropriation.

The present invention can provide means to quickly disable controlled source inks when their physical security is compromised. The present invention can provide means to prevent reuse of secure inks by removing them from secure ink containers. The present invention can provide means to identify fraudulent use of controlled inks. The present invention can provide means to prevent use of secure inks in an unapproved ink cartridge. The present invention allows consumers to use controlled source inks to print valuable documents, such as postage evidence and tickets, and helps to protect secure inks from misuse when they are distributed to end users for use in specific secure applications.

Figure 5:
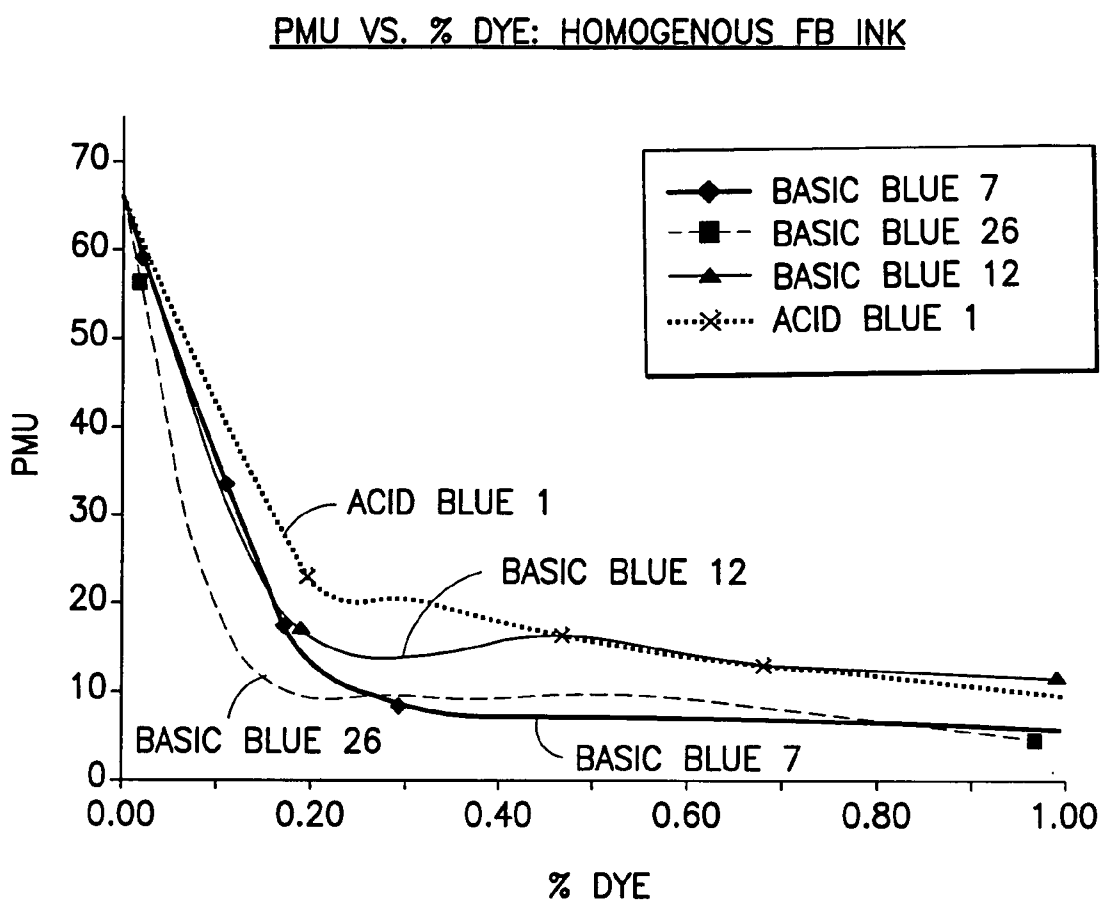
FIG. 5 is a chart showing heterogeneous black fluorescent ink intensity when various concentrations of additional dyes are added.

This approach works for both homogeneous inks and for heterogeneous inks. Referring again to FIG. 4, In the case of homogeneous inks the best quenchers proved to be Acid Blue 1 and Acid Blue 9. Referring also to FIG. 5, in the case of the heterogeneous formulations the best quenchers were basic blue dyes such as Basic Blue 26 and Basic Blue 7 as shown in plots of their fluorescence decay profiles.

Figure 6:
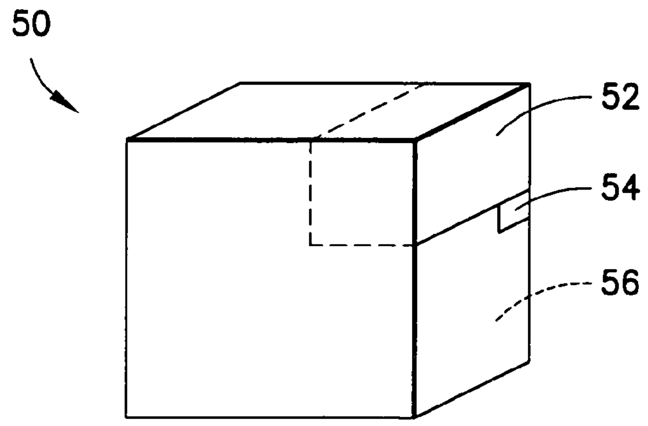
FIG. 6 is a schematic perspective view of an alternate embodiment of an ink cartridge incorporating features of the present invention.

Referring also to FIG. 6, a perspective view of an alternate embodiment of the present invention is shown. In this embodiment, the ink cartridge 50 comprises all of the features of the ink cartridge 14, but includes a security system 52. The security system can comprise two basic means to ensure that the ink is not being used in the wrong printer: an interlock to enable the secure ink cartridge, or a tamper sensor to permanently disable the cartridge.

For the interlock security system embodiment, the security system 52 could be a positive interlock to enable an ink cartridge piezo-electric drivers/ink valves/ink pumps when the cartridge was installed in a compatible printer. This could be as simple as a switch to activate the cartridge that was pushed by a matching pin in the printer socket. There could be a serial number printed on the ink cartridge 50 to enter into the printer 10 to activate the printer cartridge 50. A secure encryption algorithm would prevent decoding and activation on unapproved printers. The printer could even require periodic inspections with a timeout feature if it were not recertified for ongoing operations with controlled inks. This could also be implemented as a unique electronic signature in the printer cartridge (or electronic contact pattern) that would only be activated in designated printers.

The security system 52 could be a tamper switch that permanently disables the cartridge if attempts were made to activate it improperly. This could be as simple as a band around the cartridge that, when removed, would release an internal spring loaded pin to puncture the secure internal membrane 28 separating the quenching chemical and the controlled ink chamber. This could be an internal fused circuit element which would be electrically triggered or disconnected so that the circuit would no longer operate. Any attempt to open the cartridge and repair the disabled circuitry would break the membrane seal separating the quenching solution from the controlled ink. This could be as complex as a set of interlocks or encrypted signals that would trigger quenching of the controlled ink when the ink cartridge was operated in an unauthorized printer or was tampered with. The trigger mechanisms could include burning a hole in the protective membrane and releasing the quenching materials if power were applied to the cartridge before the secure code was entered (in the authorized printer, the code could be entered or detected before the power was applied to the cartridge).

The quenching or disabling of secure “controlled source” inks can be accomplished through a number of mechanisms. Quenching of the fluorescence activity by means of another chemical (described above) can be used. Coagulation or clumping of the controlled ink preventing it from being printed through an ink jet nozzle an be used. Thickening or polymerization of the solvent fluid preventing printing through an ink jet nozzle an be used. Changing the visible color of the controlled ink to make it obvious that it has been tampered with can be used. Changing the pH or ionic properties of the ink to cause irreversible changes in the ink properties which prevent it from being printed through an inkjet nozzle can be used.

One means of causing sudden changes in the ink formulations is by using effective thickeners. Three different rheology modifiers were obtained from Rohm & Haas. Acrysol ASE-60 (Alkali Swellable Emulsions) series is comprised of acid-containing acrylic emulsion copolymers that are supplied at high solids and low viscosities. When neutralized with alkali, these products become clear, highly viscous solutions. This product can be easily blended to obtain intermediate rheologies. Acrysol RM-825 is an extremely efficient nonionic associative thickener supplied as a low viscosity solutions, allowing for bulk handling and easy of incorporation, thereby reducing raw material and production-related costs. Acrysol RM-825 can be used in both interior and exterior paints formulations. Rhoplex WL-96, a hydrophobically modified ethylene oxide urethane block copolymer, is used for applications which require high gloss and early property development.

All three were added in 1% and 2% concentrations to a heterogeneous fluorescent black ink to determine their effect on viscosity. Table I shows the results:

TABLE 1

Viscosity Changes Associated with Rheology Modifiers

| Rheology Modifier | Initial Viscosity | After 1% addition | After 2% addition | % Viscosity Gain per 1% additive |
|---|---|---|---|---|
| Rhoplex WL96 | 6.77 cp | 6.65 cp | 6.34 cp | 0% |
| Acrysol ASE60 | 6.77 cp | 6.95 cp | 6.50 cp | 0% |
| ASE60 + 1% TEA | 6.77 cp | ?? | 31.19 cp | 200% |
| Acrysol RM825 | 6.77 cp | 14.56 cp | 32.96 cp | 200% |

The Acrysol RM 825worked very well to increase the viscosity with small additions. The other two modifiers did not work at all. Acrysol ASE60 thickens when mixed with basic solutions, the Lumikol FB formulation is slightly acidic, however, therefore a much better effect would be seen if a pH modifier is used.

Theft of secure ink and reuse in a non-secure system could allow counterfeit postage or other secure documents to be printed without authorization. The present invention helps secure the ink and can disable unauthorized use of the ink cartridge. A particular application is described in which the ink is being distributed for use in a device by an end user. The objective is that an ink jet cartridge (shown in cross section in FIG. 2) protects against an end user drilling into the ink cartridge and extracting the ink for use in another unapproved application.

The outer chamber could also contain an electrical pressure sensor 54 that detects when the security of the chamber has been breached and triggers a mechanism that allows the inner ink to be absorbed onto a solid substrate 56 or (in the case of larger volumes of materials) causes the inner chamber to be sealed and locked against access or further use. Theft of controlled ink and reuse in a non-secure system could allow counterfeit postage or other secure documents to be printed without authorization. The present invention helps secure the ink and disables the security features of the ink before it can be misused. This addition prevents use of the ink in the wrong printing device and disables the printing cartridge if it is tampered with.

Security "controlled supply inks" can be stored in doubled walled containers in which the outer chamber contains a chemical that disables (or clearly marks) the security features of the ink within the inner chamber. If attempts are made to use the ink in the wrong printing device or to use the print cartridge in an unauthorized manner, the cartridge can be disabled using an interlock to enable the ink cartridge or using a tamper sensor to permanently disable the cartridge.

The system can disable a controlled ink so that ink cannot be removed from the ink cartridge and misused. The present invention can also prevent the controlled ink from being used within the intact ink cartridge. An alternative approach could comprise use of an activation key used by the user to activate the ink cartridge. Another alternative approach could comprise use of a smartcard to activate the printer or ink cartridge combination.

The present invention has been described with the secure ink contained in a single chamber within an outer chamber as shown in FIG. 2. It will be understood by those skilled in the art that the present invention is adaptable for a more complex chamber topology or geometric relationship between the chambers, wherein the secure ink chamber does not have to be totally enclosed within the chamber which contains the quencher.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An ink cartridge for a printer comprising:

a housing;

a security ink contained in the housing; and a security ink quencher contained in the housing separate from the security ink, wherein the housing comprises a rupture wall at a junction between the security ink and the security ink quencher, wherein the ink cartridge is adapted to mix the security ink quencher with the security ink upon a predetermined event, and wherein the predetermined event comprises a rupture occuring at the rupture wall causing mixing of the security ink quencher with the security ink.

2. An ink cartridge as in claim 1 wherein the housing comprises a second chamber which contains the security ink quencher and which substantially surrounds a first chamber which contains the security ink.

3. An ink cartridge as in claim 1 wherein the security ink comprises luminescent ink.

4. An ink cartridge as in claim 3 wherein the luminescent ink comprises fluorescent ink.

5. An ink cartridge as in claim 4 wherein the security ink quencher comprises a fluorescence neutralizing chemical.

6. An ink cartridge as in claim 5 wherein the fluorescent quencher chemical comprises acid21 blue ink.

7. An ink cartridge as in claim 1 further comprising an ink conduit out of a first chamber having the security ink, wherein the ink conduit comprises a non-straight path.

8. An ink cartridge as in claim 1 wherein the rupture wall comprises a flexible resilient wall.

9. An ink cartridge as in claim 8 wherein a chamber housing the security ink quencher is pressurized to exert a force against the rupture wall towards the security ink.

10. An ink cartridge as in claim 9 further comprising a pressure sensor adapted to sense pressure in the chamber.

11. An ink cartridge as in claim 1 further comprising an absorbent material adapted to absorb the controlled security ink upon the predetermined event.

12. An ink cartridge as in claim 1 wherein the security ink quencher is adapted to cause the security ink to coagulate.

13. An ink cartridge as in claim 1 wherein the security ink quencher is adapted to change viscosity of the security ink.

14. An ink cartridge as in claim 1 wherein the security ink quencher is adapted to change a color of the security ink.

15. An ink cartridge as in claim 1 wherein the security ink quencher is adapted to change a pH of the security ink.

16. An ink cartridge for for a printer comprising:

a housing;

a security ink contained in the housing;

a security ink quencher contained in the housing seperate from the security ink, wherein the ink cartridge is adapted to mix the security ink quencher with the security ink upon a predetermined event; and a security system on the housing for allowing the ink cartridge to be used with only a predetermined type of authorized printer, wherein the security system comprises a cartridge enablement system to enable printing of the security ink from the authorized printer only when the ink cartridge is installed in the authorized printer.

17. An ink cartridge for a printer comprising:

a housing;

a security ink contained in the housing;

a security ink quencher contained in the housing seperate from the security ink, wherein the ink cartridge is adapted to mix the security ink quencher with the security ink upon a predetermined event; and a security system on the housing for allowing the ink cartridge to be used with only a predetermined type of authorized printer, wherein the security system comprises a tamper system to disable the security ink or disable the ink cartridge when the cartridge is attempted to be used in an unauthorized printer or the security ink is attempted to be used in the unauthorized printer.

18. An ink cartridge for a printer comprising:

a housing;

a security ink contained in the housing;

a security ink quencher contained in the housing seperate from the security ink, wherein the ink cartridge is adapted to mix the security ink quencher with the security ink upon a predetermined event; and a security system on the housing for allowing the ink cartridge to be used with only a predetermined type of authorized printer, wherein the security system comprises a tamper system to indicate tampering when the ink cartridge or the security ink is attempted to be used in an unauthorized printer.

19. An ink cartridge for a printer comprising:

a housing;

a security ink contained in the housing;

a security ink quencher contained in the housing seperate from the security ink, wherein the ink cartridge is adapted to mix the security ink quencher with the security ink upon a predetermined event; and wherein the ink cartridge comprises a postage meter cartridge sized and shaped to be inserted into a postage meter.

* * * * *